United States Patent
Zhang (10) Patent No.: US 8,565,784 B2
(45) Date of Patent: Oct. 22, 2013

(54) SIGNAL LEVEL MEASUREMENT FOR MOBILE POSITIONING

(75) Inventor: Yang Zhang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 197 days.

(21) Appl. No.: 13/001,777

(22) PCT Filed: Jul. 7, 2008

(86) PCT No.: PCT/EP2008/058786
§ 371 (c)(1),
(2), (4) Date: Dec. 28, 2010

(87) PCT Pub. No.: WO2010/003450
PCT Pub. Date: Jan. 14, 2010

(65) Prior Publication Data
US 2011/0117930 A1    May 19, 2011

(51) Int. Cl.
*H04W 24/00*    (2009.01)
(52) U.S. Cl.
USPC .................................................. 455/456.1
(58) Field of Classification Search
None
See application file for complete search history.

(56) References Cited

U.S. PATENT DOCUMENTS

| | | | |
|---|---|---|---|
| 5,642,353 A | 6/1997 | Roy, III et al. | |
| 6,684,071 B1 | 1/2004 | Molnar et al. | |
| 2003/0139188 A1* | 7/2003 | Chen et al. | 455/456 |
| 2005/0096068 A1* | 5/2005 | Bahl et al. | 455/456.1 |
| 2007/0099633 A1 | 5/2007 | Bamberger et al. | |
| 2008/0186233 A1* | 8/2008 | McCoy | 342/444 |

FOREIGN PATENT DOCUMENTS

| | | |
|---|---|---|
| WO | 92/05672 | 4/1992 |
| WO | 98/16078 | 4/1998 |
| WO | 2005/022191 A1 | 3/2005 |

OTHER PUBLICATIONS

Yang, Z. et al. "Joint Mobility Tracking and Handoff in Cellular Networks via Sequential Monte Carlo Filtering." IEEE Transactions on Signal Processing, vol. 51, No. 1, Jan. 2003.

* cited by examiner

*Primary Examiner* — Olumide T Ajibade Akonai
*Assistant Examiner* — Shantell L Heiber
(74) *Attorney, Agent, or Firm* — Coats & Bennett P.L.L.C.

(57) ABSTRACT

Methods and systems are provided to improve the input used in, e.g., an Enhanced Cell Global ID algorithm. Reducing the variation of the input can result in a more accurate position result for a mobile positioning system when determining the position of a mobile system.

12 Claims, 11 Drawing Sheets

SIGNAL LEVEL MEASUREMENT FOR MOBILE POSITIONING

TECHNICAL FIELD

The present invention generally relates to systems, devices, software and methods and, more particularly, to mechanisms and techniques for improving mobile system positioning determination.

BACKGROUND

Communication technologies and uses have greatly changed over the last few decades. In the fairly recent past, copper wire technologies were the primary mechanism used for transmitting voice communications over long distances. One alternative that has grown in recent years is the use of cellular or mobile phones and systems. These systems allow personal telephone communications over different wireless mediums which greatly increase the ability of people to communicate and/or transfer data wherever they may be. One outcome of these wireless based communication systems, is the possibility to determine the position of a mobile device which has enabled application developers and wireless network operators to provide location based, and location aware, services. Examples of these services are guiding systems, shopping assistance, friend finder and other information services giving the mobile user information about their surroundings.

In addition to the commercial services, the governments in several countries have also put requirements on the network operators to determine the position of an emergency call. This has led to the ability for network operators to determine the position of a mobile device that is currently turned on, e.g., in an idle or busy mode, when requested by an appropriate authority. Two general methods of positioning can be described as either external methods, e.g., Global Positioning System (GPS) based methods like Assisted-GPS (A-GPS), or methods which use the wireless networks. Methods which use the wireless networks can be further broken down into two main groups. The first group includes methods that are based on the radio cell to which a mobile terminal is attached, e.g., by the using cell ID of the cell to which the mobile terminal is currently assigned. The second group uses measuring of radio signals from several base stations and determining the terminal position using, e.g., Time Difference (TD).

In order to be able to connect to a mobile network or to perform handover when connected, a mobile terminal is typically constantly measuring available signals, not only from their own base station, but also from other base stations. These signals are typically control signals intended for measuring radio conditions of transmission, which control signals contain, among other data, information about how to establish a connection to the transmitting base station. In particular, the control signals include data, which by itself or in combination with the frequency of the carrier on which the control signal was transmitted, constitute base station identification data. A mobile terminal can thus obtain an identity of the transmitting base station and an estimate of the radio conditions. The mobile terminal typically compiles this information, e.g., in Global System for Mobile communications (GSM) systems, in a neighbor list, which is transferred to the network as information.

Position estimation can be based on measurements in the neighbor list. For this, one then uses the relation between the distance from the radio base station and the radio condition in combination with knowledge about the exact position of the base station. The base station positions are known within the communications network. This means that the neighbor list can be used for position estimation according to different algorithms. The accuracy of the position estimation is generally proportional to the size of the cell.

Triangulations or TD methods, use signals associated with two or more different base stations. These signals are used to calculate the position of a mobile terminal or the distance from the base station at which a mobile terminal is located. The calculations are based on the relative or absolute difference in the time that it takes for a signal to propagate between the terminal and the different base stations. The achievable accuracy of TD methods depends, for example, on system architecture, physical conditions and radio conditions. Typically, the accuracy of a TD method for a mobile telephony system is 50 to 150 meters, however, TD methods are relatively time and resource consuming.

In the current market for mobile positioning systems, the most popular and standardized mobile positioning methods are Cell ID based, A-GPS and Uplink Time Difference of Arrival (UTDOA). Both A-GPS and UTDOA require either relatively significant hardware and/or software modification to be implemented in a wireless system. For example, A-GPS requires special chipsets to be present in the mobile device and UTDOA requires hardware, e.g., local measurement units, to be installed at multiple base stations to perform accurately. These hardware requirements make both A-GPS and UTDOA alternatives relatively more expensive than mobile positioning methods which are Cell ID based, since Cell ID based methods tend to require no additional hardware or special software changes to a mobile terminal. Additionally, Cell ID based mobile positioning methods can act as an effective backup when other positioning methods fail or are not available.

Figure 1:
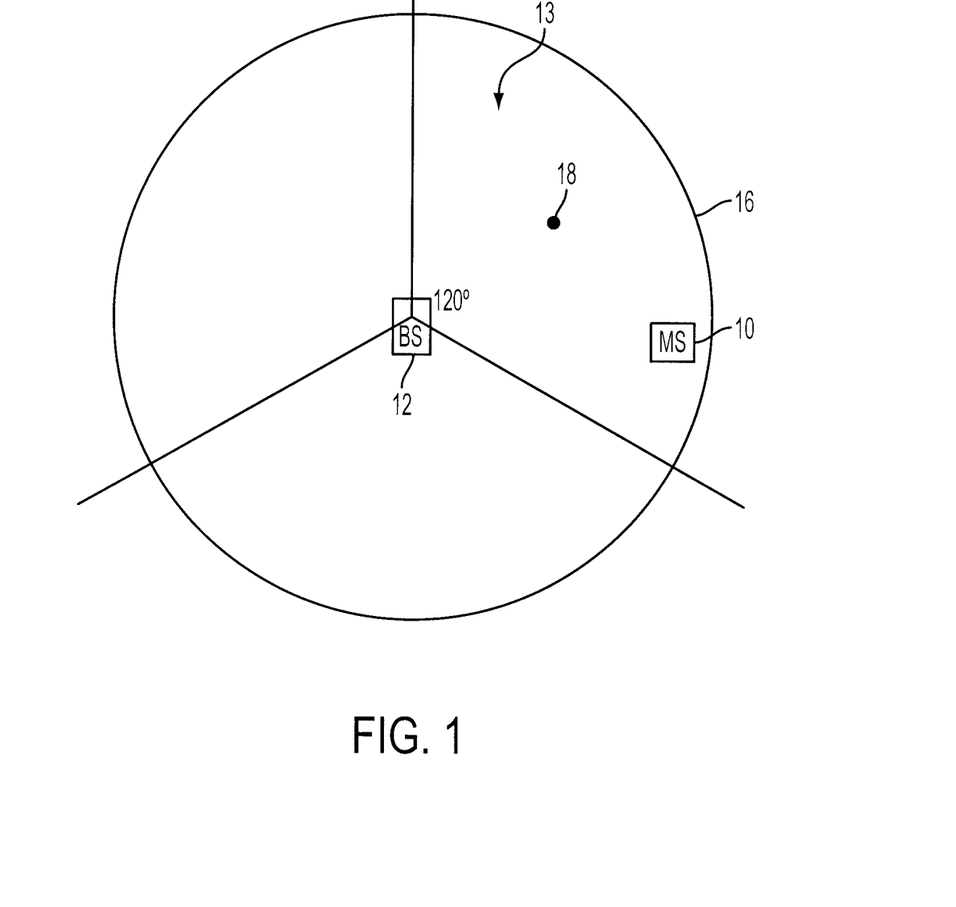
FIG. 1 shows a conceptualization of the Cell ID method of positioning.

In its simplest form, the Cell ID method of position can be conceptualized as shown in FIG. 1. Therein, a mobile station or terminal MS 10 which is connected to a base station 12 is known to be somewhere within the region 13 defined by that base station 12's 120 degree directional antenna (not shown) and outer periphery 16 associated with the base station 12's transmission/reception range. Thus the MS 10's position can be reported to be that of a central point 18 within that sector, the accuracy of which will be determined by the size of the cell and the MS's actual position relative to point 18.

Figure 2:
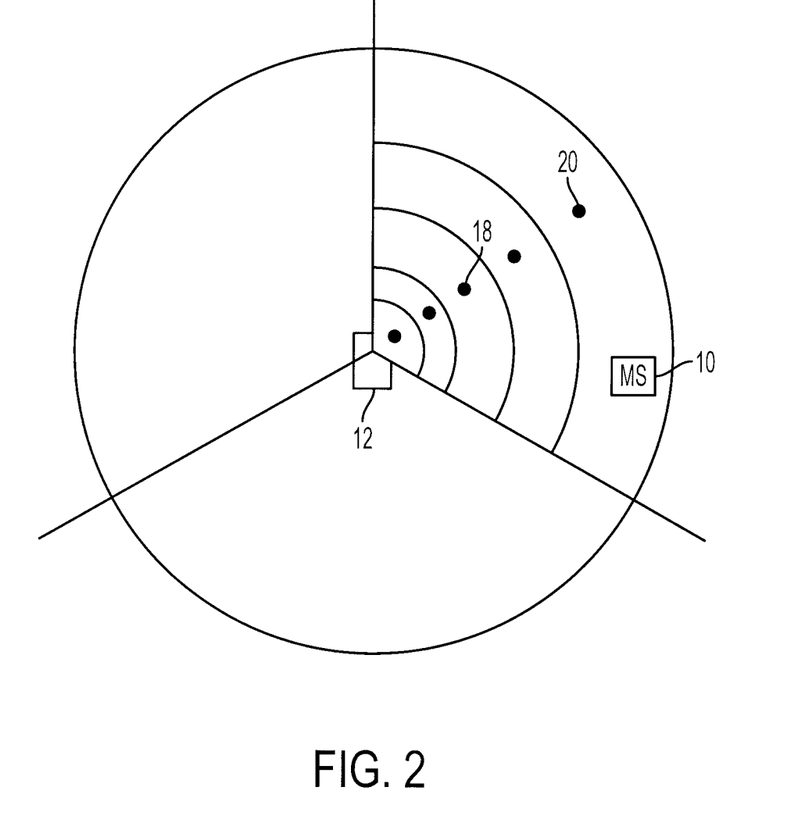
FIG. 2 illustrates a conceptualization of the Cell ID method of positioning combined with timing advance.

An enhancement to the basic Cell ID positioning technique involves using timing advance (TA) information to improve the granularity of positioning. TA information is available in the network for each connection between an MS 10 and a BS 12 and relates to the amount of time for a signal transmitted by MS 10 to reach BS 12. Initially used for adjusting uplink transmission times to control interference, the TA information also provides a rough estimate of a connected MS's relative distance to its BS 12. For positioning purposes, this means that in addition to the Cell ID, an MS 10's position can be further pinpointed to within an arcuate band associated with its current TA as shown in FIG. 2. Although only five TA bands are shown in FIG. 2, it will be appreciated that most radio communication systems will have more TA values.

More recently, another modified Cell ID based global positioning method known as Enhanced Cell Global Identity (ECGI) has been introduced, which method uses information from a mobile system measurement report in addition to the timing advance (TA) value to improve the accuracy of currently used CGI/TA methods. ECGI is described, for example, in U.S. Patent Publication No. 2006/0267840, the disclosure of which is incorporated here by reference. Among other things, the ECGI algorithm uses the difference in path loss of the serving and the co-sited neighbor cells in combination with the TA value and serving cell coordinates in order to estimate the mobile system position.

However, as will be described below, the use of pathloss measurements introduces other potential inaccuracies into the output of, e.g., the ECGI algorithm. Accordingly, it would be desirable to provide devices, systems and methods for improving the accuracy of positioning methods.

SUMMARY

The following exemplary embodiments provide a number of advantages and benefits relative to determining a position of, e.g., a mobile station. It will be appreciated by those skilled in the art, however, that the claims are not limited to those embodiments which produce any or all of these advantages or benefits and that other advantages and benefits may be realized depending upon the particular implementation.

According to an exemplary embodiment, a method for determining a position of a mobile station (MS) in a mobile radio system includes: receiving, from the MS, a plurality of received signal strength measurements; processing, through non-linear filtering, a plurality (N) of received signal strengths to produce a first output; determining at least one pathloss associated with the MS using the first output; and determining a position of the MS using the at least one pathloss.

According to another exemplary embodiment, a device includes: a communications interface for communicating, wherein the communications interface receives a plurality (N) of measurement reports from a mobile station (MS) and further wherein each of the plurality (N) of measurement reports includes an indicator of a received signal strength; and a processor which processes the plurality (N) of received measurement reports to produce a first output using non-linear filtering, determines at least one pathloss associated with the MS using the first output, and determines a position of the MS using the at least one pathloss.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8(*a*) illustrates different ECGI inputs for the case where N=3 according to exemplary embodiments;

FIG. 8(*b*) illustrates different ECGI inputs for the case where N=4 according to exemplary embodiments;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of presence systems described below. However, the embodiments to be discussed next are not limited to these systems but may be applied to other existing communication systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

As mentioned above, it is desirable to provide mechanisms and methods that provide, for example, improvement in the accuracy of an Enhanced Cell Global Identity (ECGI) output (or other positioning methods which rely upon signal strength measurements) by reducing the effects on the positioning algorithm of potential variations of a mobile channel. In order to provide context for this discussion, an exemplary grouping of devices and communication links which together can be considered a mobile positioning system (MPS) 310 will now be described with respect to FIG. 3.

Figure 3:
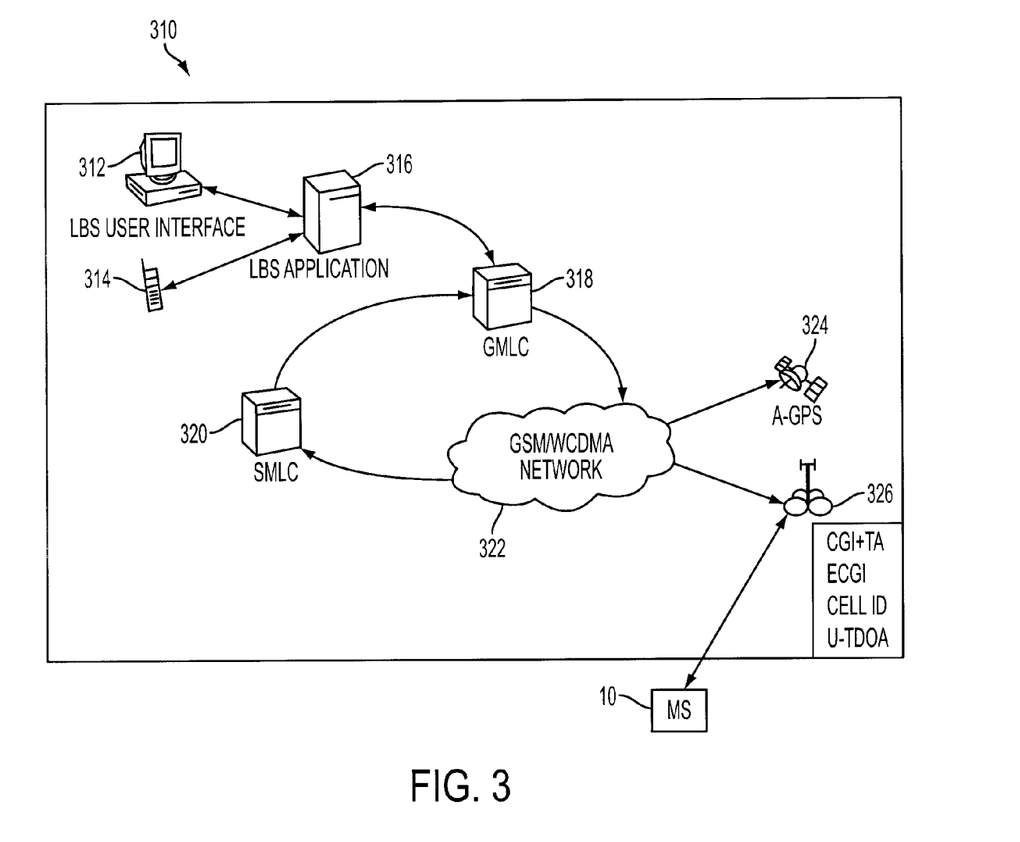
FIG. 3 shows a mobile positioning system (MPS) according to exemplary embodiments.

According to exemplary embodiments as shown in FIG. 3, the initial step in utilizing the MPS 310 typically involves generating a request for the position of a mobile station or terminal (MS) 10 by a location based service (LBS) user interface which could, for example, include a terminal 312 or a mobile phone 314. In this example, the request for the position is generated by the LBS user interface 312, 314 and is transmitted to an LBS application 316, which is typically provided by the operator or by a service provider on, for example, the Internet. The LBS application 316 forwards (or generates based on information received from the LBS user interface 312, 314) the request to the Gateway Mobile Location Centre (GMLC) 318 for the position of an MS 10. The GMLC 318 performs, among other activities, an authorization check on the position request. If authorized, the GMLC 318 forwards the position request to the Serving Mobile Location Centre (SMLC) 320 via a network 322, e.g., a Global System for Mobile communications (GSM) network or a Code Division Multiple Access (CDMA) network, which then collects position information related to MS 10 from the network 322 and calculates the coordinates to be used by the application.

Depending upon the method used to calculate the position of MS 10, different sources can provide information to the network 322. For example, if the method to be used is Assisted Global Positioning System (A-GPS), information could be provided from a satellite 324 (or other ground based equipment in communication with the satellite 324 which has the positioning information). Alternatively, if the method is one of ECGI, CGI plus Timing Advance (TA), Cell ID or Uplink Time Difference of Arrival (UTDOA) then the information could be provided or forwarded from MS 328 by the cell/base station/eNodeB 326 (depending upon type of radio access network (RAN) that the MS 10 is connected with).

After the SMLC 320 calculates the coordinates, the SMLC 320 delivers the coordinates to the GMLC 318 which in turn generates a position response. The position response is then transmitted to the LBS application 316 which in turn forwards the position response to the requesting LBS user interface 312 or 314. Of particular interest for these exemplary embodiments are techniques for improving the accuracy of the ECGI method when that method is used by MPS 310 for determining the position of MS 10.

Figure 4:
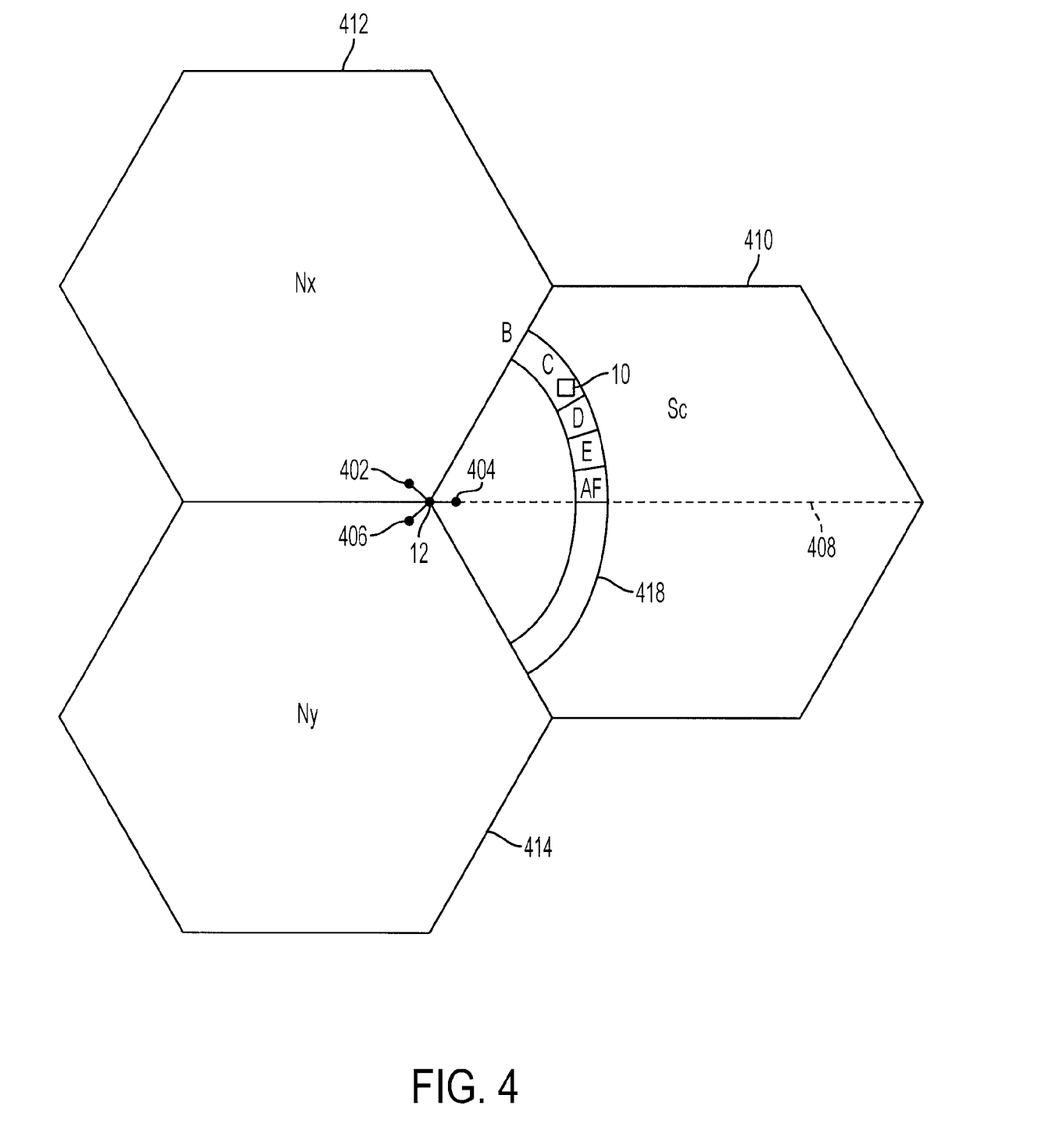
FIG. 4 illustrates Enhanced Cell Global ID (ECGI) with timing advance and sectors associated with pathloss according to exemplary embodiments.

Cell ID (also known as Cell Global Identity (CGI)) techniques use the network's information regarding the MS 10 within a controlling cell site as well as the associated sector information to generate an estimate of the location of the MS 10. ECGI improves upon CGI by the addition of more TA information as well as network information, e.g., network management records (NMR), and will now be described in more detail with respect to FIGS. 4 and 5. FIG. 4 shows a base station that supports a service cell Sc 410, a neighbor cell Nx 412 and another neighbor cell Ny 414. Each cell also has its own directional antenna located at base station 12, that is, for example, Sc 410 has directional antenna 404, Nx has directional antenna 402, and Ny 414 has directional antenna 406. Each directional antenna 402, 404 and 406 covers a 120 degree arc for transmission and reception. In this example, MS 10 is located in cell Sc 410 and the TA zone 418 is known. To further enhance the accuracy of the position estimate generated by the ECGI algorithm, comparing received signal strengths for each cell zone by their respective directional antenna are compared with one another.

Figure 5:
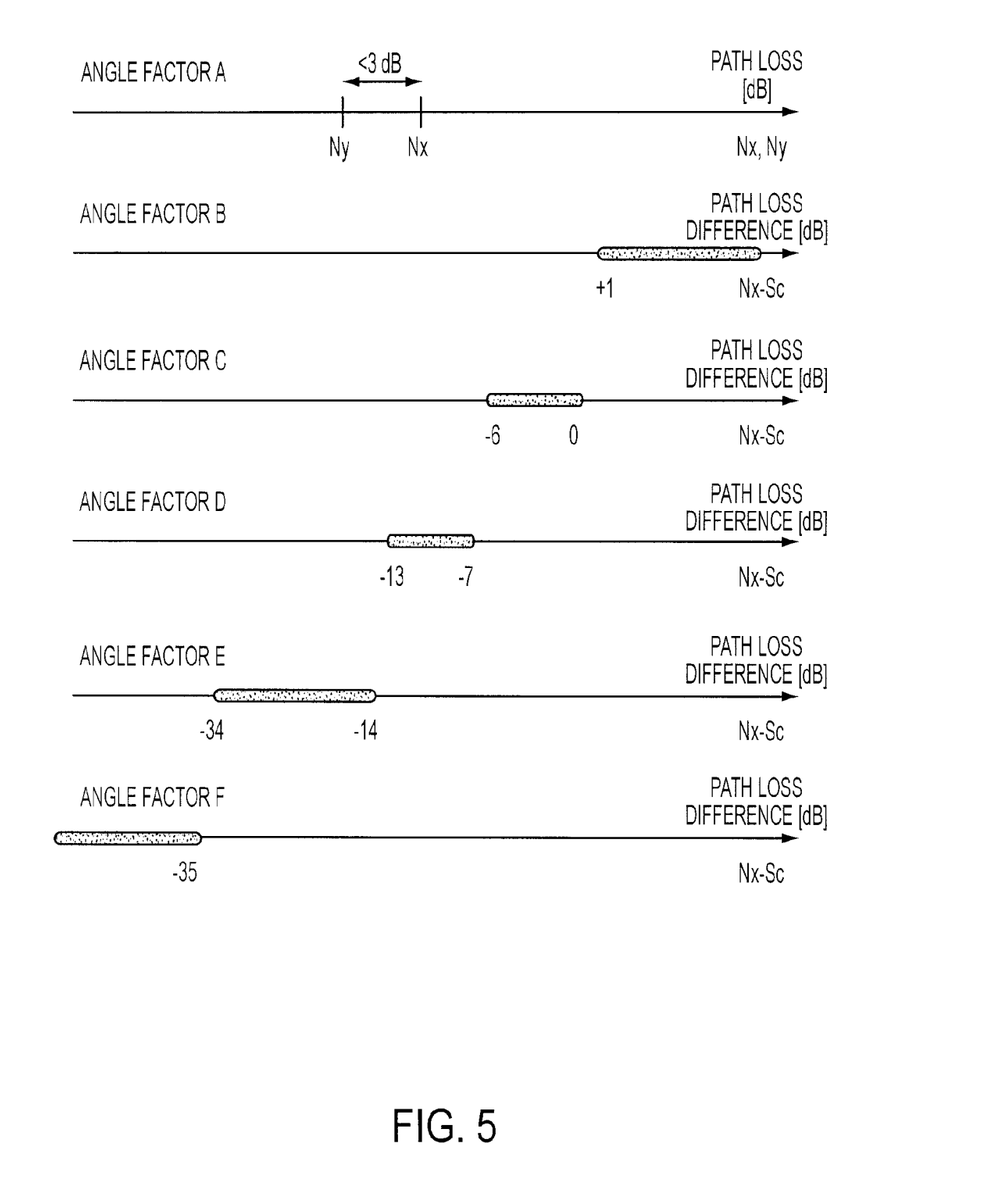
FIG. 5 depicts angle factors associated with pathloss according to exemplary embodiments.

Continuing with this example, the signal strength received by cell Nx 412 is at least as strong as the signal strength received by cell Ny 414, therefore only the section of the TA zone 418 above the center line 408 is where MS 10 is expected to be. Depending upon the relative received signal strengths received, different sectors within the TA zone 418 are defined and shown as A, B, C, D, E and F. These sectors, as shown in FIG. 4, are also known as angle factors and are defined by their relative signal strengths as shown in FIG. 5. For example, MS 10 submits an Rx_lev in a measurement report to cells Sc 410, Nx 412 and Ny 414. The value received by Nx 412 is greater than that received by Ny 414. The signal strength received in Nx 412, for example, is a value of 34 dB and the signal strength received in Sc 410 is 39 dB, generating a relative difference of −5 dB which puts the position of MS 10 in sector C of the TA zone 418 based on the angle factors shown in FIG. 5.

Figure 6:
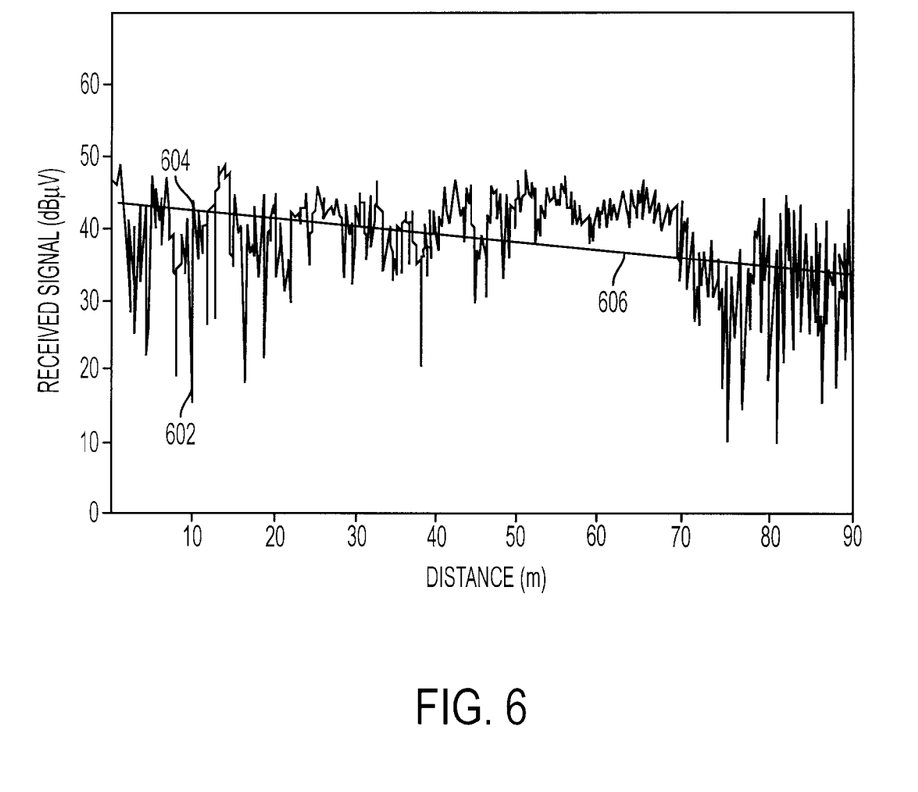
FIG. 6 shows a plot of Rx_lev with a trend line in an urban environment according to exemplary embodiments.

Since the ECGI algorithm is also based on the behavior of pathloss, the variation of the mobile channel can make Rx_lev as currently used an unreliable measurement element. More specifically, Rx_lev is a snapshot of the received signal power during the previous 480 ms and not always an accurate measurement/estimate of the actual trend of the received signal power. For example, as shown in FIG. 6, there is a sizeable amount of variation between the individual data points for the characteristic of received signal strength, e.g., Rx_lev, over distance for the 900 MHz signal in a typical urban environment. As can be seen, the variation can be large, e.g., 20-30 dB, between individual data points, e.g., data points 602 and 604. But if one were to look at the trend, the difference between individual data points 602, 604 and the exemplary trend line 606 is reduced as compared to the difference between individual data points. Also the change in the exemplary trend line 606 over time is relatively small.

Considering this variation of 20-30 dB it can be seen that it would be relatively easy for the pathloss calculated based upon such highly variable measurements could result in the MS 10 actually being located in a sector other than the sector which the calculated position would describe, e.g., the outcome of a position calculation could result in MS 10 as being calculated to be in sector D of FIG. 4 when MS 10 is actually in sector C. According to exemplary embodiments, methods and systems for ECGI calculations can use a value closer to the trend of the measured signal strength which results in a more accurately defined position of MS 10.

For example, filtering can be used to reduce the variance of measurement as compared to just using a snapshot of the Rx_lev in the ECGI algorithm. The distribution of the signal level is typically a Rayleigh or a Ricean distribution. In these types of distributions, the probability of a fading or weaker signal is much larger than the probability that the signal is stronger, i.e., the signal strength level of a single data point is above the signal trend. This can be seen in FIG. 6 where there is a larger quantity of data points below the exemplary trend line 606 than there are above it.

According to exemplary embodiments, a method for filtering can be described using the following steps. Initially the SMLC 320 obtains the measurement report N times, e.g., two, three, four or more times. The measurement reports can be obtained by the SMLC 320 by requesting them from a base station controller or by the SMLC 320 extracting them from ongoing measurement reports being made by a mobile station and being reported by associated signaling messages. The Rx_lev, or other desired indicator of signal strength, is taken from the plurality of measurement reports and is put through a filtering or averaging process to make the output signal level closer to the signal trend. This filtering process could be linear or non-linear filtering. The output signal level is then used by the ECGI algorithm which is typically performed at the SMLC 320 to generate a more accurate position for MS 10.

One change that needs to be accounted for when requesting the measurement report N times is that the positioning calculation response time will now be longer since more than one measurement report is being used in the ECGI calculation. For example, using current timing, a measurement report can be received every 480 ms, so roughly two measurement reports can be received each second. Other than for Assisted Global Positioning System (A-GPS) methods response time is not currently considered a commercial bottleneck, instead, positioning accuracy attracts more concern. However, with that being understood, at some point if a method were to use a large enough value for N, response time could become an issue.

According to exemplary embodiments, one method for generating an improved signal level value for use in the ECGI algorithm is to use the parameter estimation formula of a Rayleigh distribution as shown in equation (1).

$$\text{Rx\_lev\_wanted} = \sqrt{\frac{1}{2N} \sum_{i=1}^{N} (\text{Rx\_lev\_in\_MR}_i)_2} \quad (1)$$

Simulations based on both theoretical data and real data have both showed that the formula shown in equation (1) tends to provide more accurate results for a large N value.

According to other exemplary embodiments, an improved ECGI position can be calculated by using a signal level estimation based on the following non-linear filtering method. Initially a value for N is determined, followed by sorting from highest to lowest the N consecutively received Rx_lev values.

Then take the N/3 element (rounding to the nearest integer) for use in the ECGI algorithm. The N/3 element's (rounding to the nearest integer) Rx_lev is one exemplary option for use in the ECGI algorithm since in either a Rayleigh or Rician distribution the normalized signal level, e.g., the trend value, is roughly ⅓. For example, in the case where N=4, four consecutive Rx_lev values are received from four different consecutive measurement reports. These four Rx_lev values are then ranked from highest to lowest as A, B, C and D. Since N=4, the 4/3 element, rounding to the nearest integer, results in a value of 1. Which then results in using the first value A (highest value) as the input to the ECGI algorithm.

According to another exemplary embodiment, N should typically not be a large value because at some value of N too many received measurement reports can cost an SMLC 320 too much time as well as creating a potentially undesirable response time to the position location query. Also at some large value of N it is possible for the reliability of the position estimate to decrease when the MS 28 is moving at relatively higher speeds. Accordingly, in some exemplary embodiments, N is typically preferred to be 4 or less. In the case of N=4, the second highest value of Rx_lev can be used as the input to the ECGI algorithm. In the case of N=3, the average of the largest two values can be used as the input to the ECGI algorithm, and in the case of N=2 the largest of the two values for Rx_lev can be used as the input to the ECGI algorithm.

Figure 7:
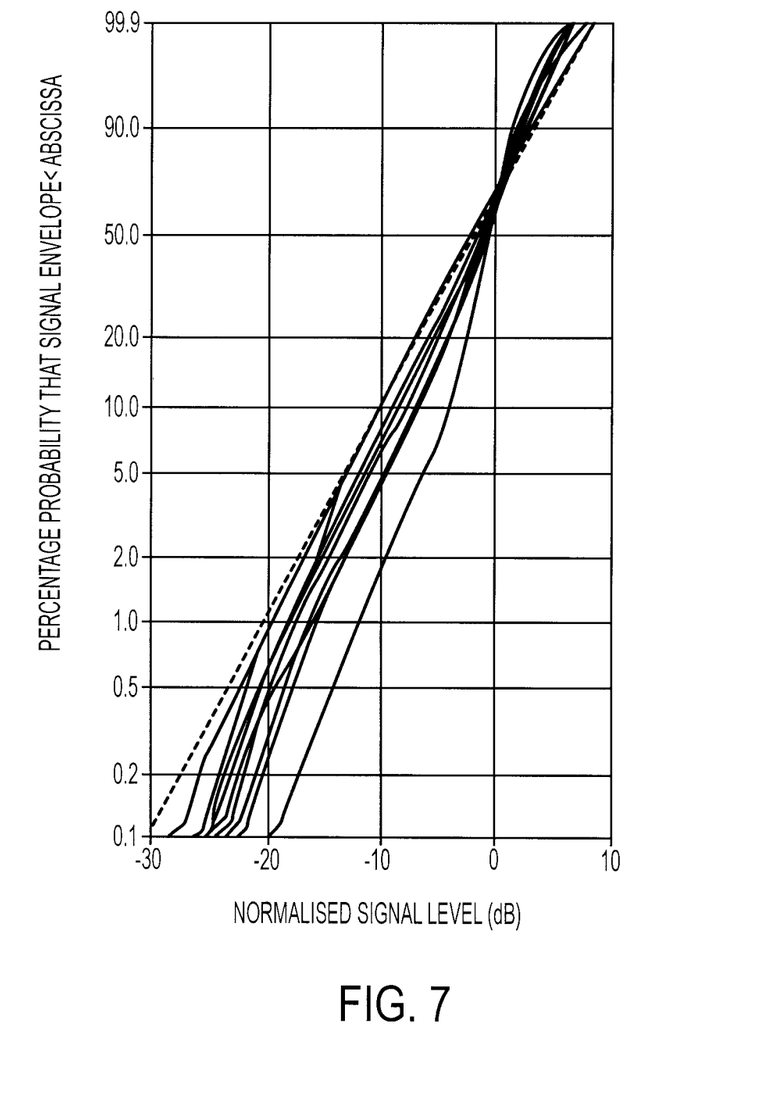
FIG. 7 shows normalized signal levels according to exemplary embodiments.

Using the above described exemplary embodiments, an evaluation of field test results from 63 consecutively transmitted measurement reports in a case where the MS 10 did not move will now be described with respect to FIGS. 7, 8(a) and 8(b). Initially the Rx_lev from each of the 63 consecutive measurement reports is used to create a cumulative distribution of the signal level as shown in FIG. 7 and ECGI plots for N=3 and N=4 in FIGS. 8(a) and 8(b) respectively. From these graphs it is seen that, in this case, the signal level strength changed in value over time during the 63 measurement reports. More specifically FIG. 7 describes the probability of a signal level occurring that is lower than a certain normalized signal level. It can be seen that, in this exemplary FIG. 7, the "signal trend", i.e., 0 dB, corresponds to a probability of roughly 67%. The specific value of this probability threshold could be implementation dependent. For example, the probability threshold could vary for a signal trend of 0 dB when not creating a large negative impact on the results. This variance could occur for different environments, e.g., urban or rural environments. Additionally, for different probability thresholds based upon different environments or other conditions, the desired value for N can change.

Figure 8A:
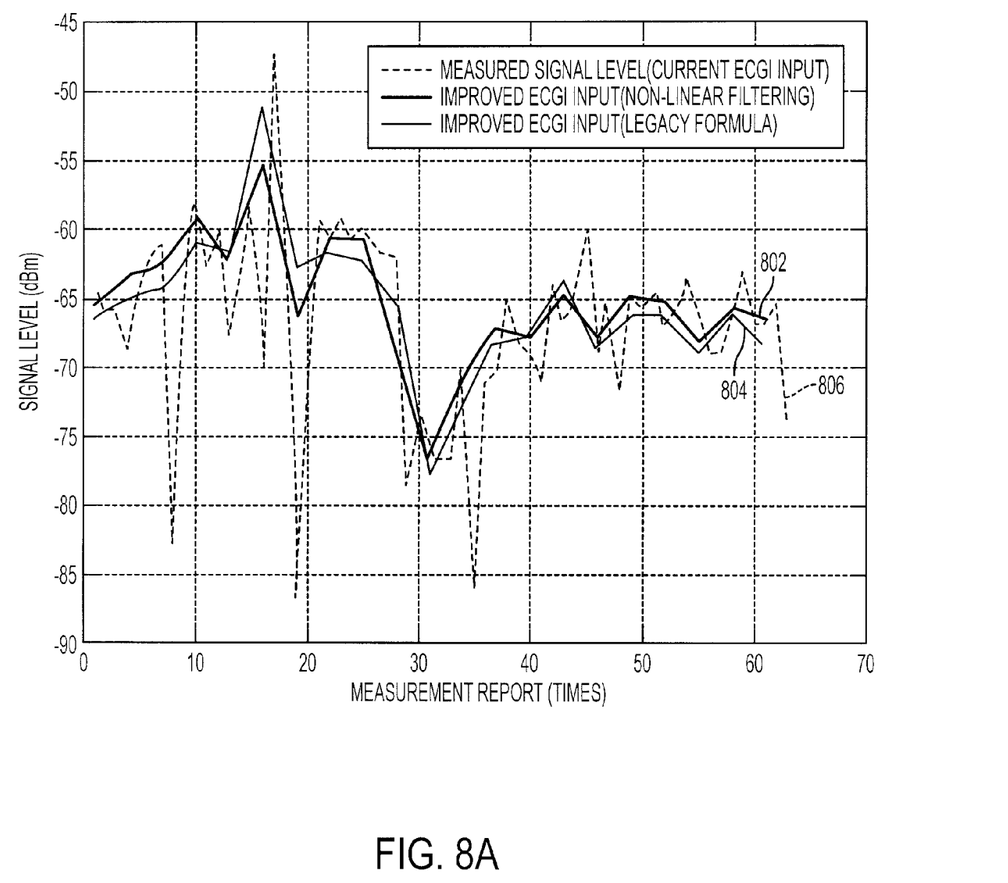
Figure 8B:
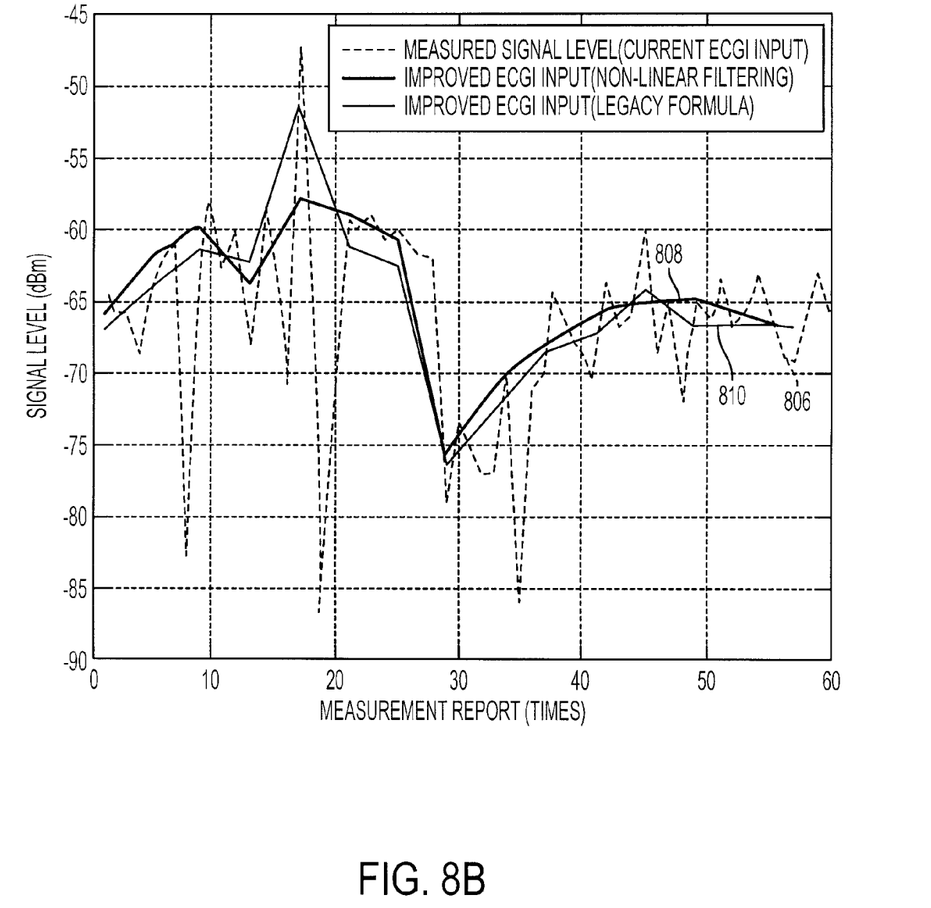

As shown in FIG. 8(a) it can be seen that the current ECGI algorithm input, i.e., individual Rx_lev values, is represented as dashed line 606, undergoes a signal level difference of approximately 40 dB, i.e., the difference between the largest and lowest signal level is approximately 40 dB. By way of comparison, the improved ECGI input using non-linear filtering with N=3, i.e., using the average of the largest two values as the input to the improved ECGI algorithm, is represented as a solid line 802 and has a variation of only 22 dB. Also for comparison, the ECGI input based on equation (1) is shown by solid line 804. For yet another comparison, FIG. 8(b) shows the case where N=4 with the dashed line 806 representing the current ECGI inputs, solid line 804 represents the case for the ECGI input based on equation (1) and solid line 802 shows the case using the improved ECGI input from the non-linear filtering method.

From these graphs, it can be seen that using the improved ECGI input from the non-linear filtering method reduced the possibility of a large positioning error, e.g., pathloss dragging into an incorrect angle factor, since the dB variation is consistently reduced from the current ECGI input which uses the snapshot of Rx_lev from a single measurement report. Also, as shown below in Table 1, the improved ECGI input from the non-linear filtering method performs better than the ECGI input based on equation (1) at least for the cases of N=3 and N=4 for the tested data. Also the non-linear filtering method is simpler and as such would use fewer processing and memory resources.

TABLE 1

| | N = 3 (non-linear filtering) | N = 3 (Equation 1) | N = 4 (non-linear filtering) | N = 4 (Equation 1) |
|---|---|---|---|---|
| Dynamic Range Reduction (dB) | −45% | −32% | −55% | −37% |

As described above, exemplary FIGS. 7, 8(a) and 8(b) show data for a case where the measurement reports are from a MS 10 which is stationary with a probability threshold of roughly 67%. If the MS 10 is moving, e.g., the MS 10 is with a walking person, the chance for an individual Rx_lev to be above an exemplary trend could decrease even more than for a stationary case. In this scenario, the proposed exemplary embodiments for ECGI inputs will still provide a more robust input to the ECGI algorithm than is currently being used for the same reasons described above.

As described above, the position of MS 10 can be determined using an ECGI algorithm which compares signal strength from the serving cell and the neighboring co-sited cells. According to an exemplary embodiment, the above described non-linear filtering processes can be applied to the signal level difference between the serving and neighboring cells to further reduce the variance of the calculated position of MS 10.

Figure 9:
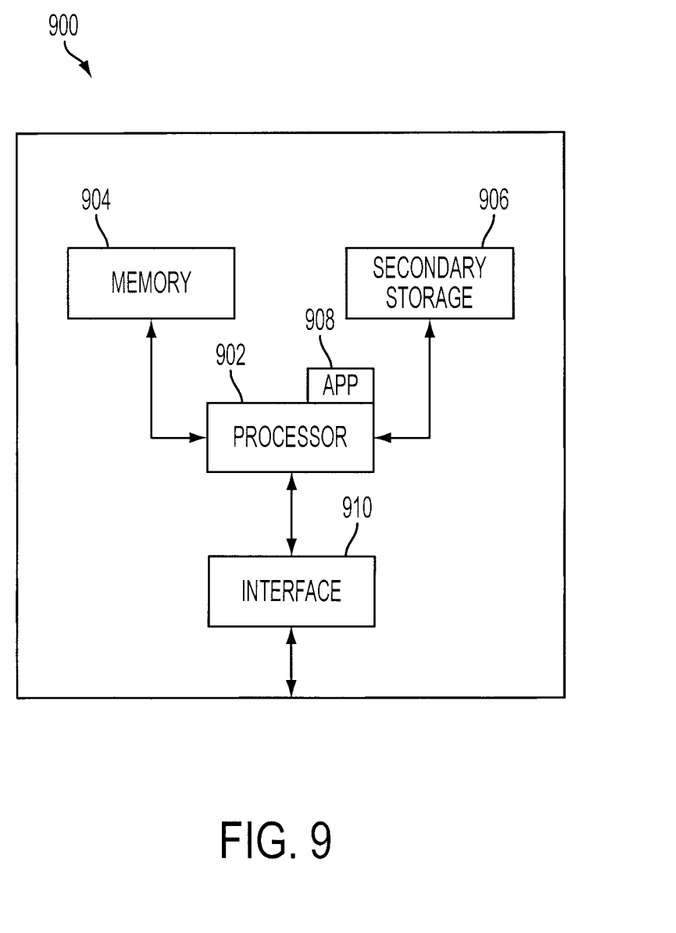
FIG. 9 shows a communications node according to exemplary embodiments.

The exemplary embodiments described above illustrate methods and systems for using improving the input to the ECGI algorithm in order to reduce the error based upon signal variation which in turn improves the accuracy of the position report with respect to MS 10 using MPS 310. An exemplary communications node 900, capable of performing the exemplary filtering described above as well as the ECGI algorithm, will now be described with respect to FIG. 9. Communications node 900 can contain a processor 902 (or multiple processor cores), memory 904, one or more secondary storage devices 906, a software application (or multiple applications) 908 and an interface unit 910 to facilitate communications between communications node 900 and the rest of the network or other devices. The software application 908 in conjunction with the processor 902 and memory 704 can execute instructions and perform functions used to improve the input to the ECGI algorithm as well as run the ECGI algorithm to generate (and store as needed) the position of MS 10.

Figure 10:
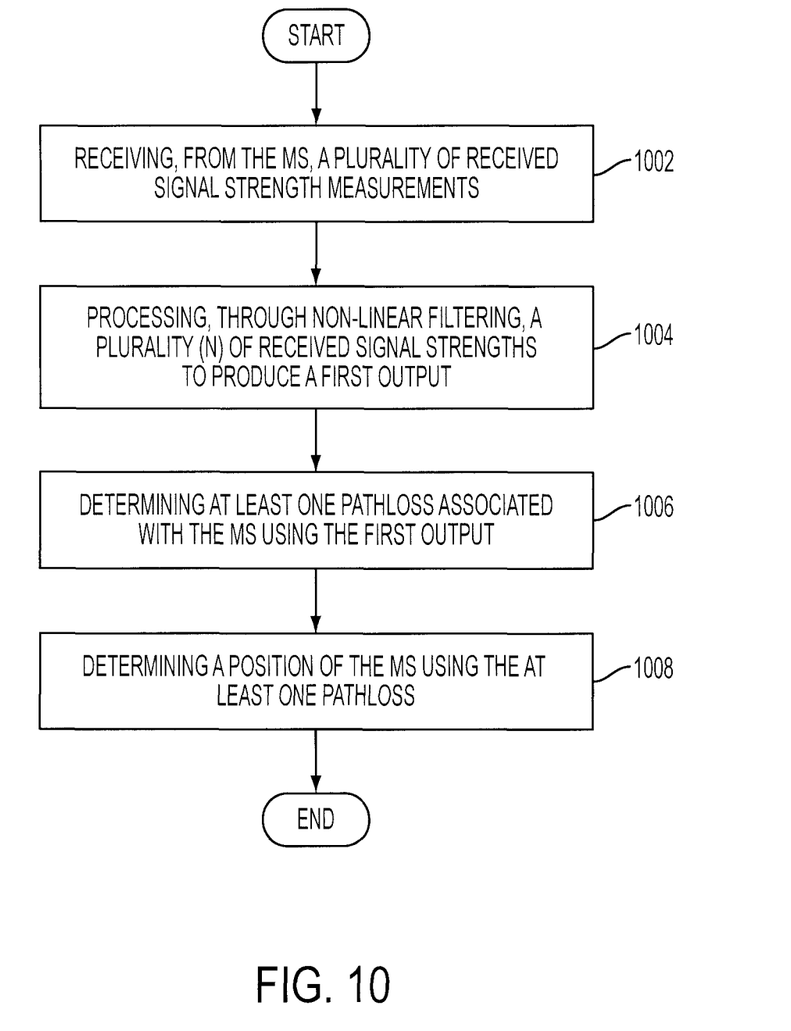
FIG. 10 shows a method flow diagram for determining a position of a mobile station (MS) according to exemplary embodiments.

Utilizing the above-described exemplary systems according to exemplary embodiments, a method for determining a position of MS 10 is shown in the flowchart of FIG. 10. Initially a method for determining a position of a mobile station (MS) in a mobile radio system includes: receiving, from the MS, a plurality of received signal strength measurements in step 1002; processing, through non-linear filtering, a plurality (N) of received signal strengths to produce a first output in step 1004; determining at least one pathloss associated with the MS using the first output in step 1006; and determining a position of the MS using the at least one pathloss in step 1008.

Although the features and elements of the present exemplary embodiments are described in the embodiments in particular combinations, each feature or element can be used alone without the other features and elements of the embodiments or in various combinations with or without other features and elements disclosed herein. Additionally, it should be recognized, however, that the principles of the present exemplary embodiments are equally applicable to other types of wireless networks and positioning algorithms which would be improved by using a non-linearly filtered value for Rx_lev or similar measurement report parameter. The methods or flow charts provided in the present application may be implemented in a computer program, software, or firmware tangibly embodied in a computer-readable storage medium for execution by a general purpose computer or a processor.

The invention claimed is:

1. A method for determining a position of a mobile station in a mobile radio system, the method comprising:
   receiving from said mobile station N received signal strength measurements that indicate received signal strength relative to a given cell at different times, wherein N is either 2, 3, or 4;
   sorting the N received signal strength measurements from highest to lowest strength;
   processing the N received signal strength measurements to produce a first output, by selecting as the first output the largest received signal strength measurement when N is 2, an average of the two largest received signal strength measurements when N is 3, and the second largest received signal strength measurement when N is 4;
   determining at least one pathloss associated with said mobile station using said first output: and
   determining a position of said mobile station using said at least one pathloss, by determining an arc within which said mobile station is located based upon timing advance information and determining a sector within said arc within which said mobile station is located based upon said at least one pathloss.

2. The method of claim 1, further comprising:
   receiving a request from an application to determine said position of said mobile station; and
   transmitting said position of said mobile station to said application.

3. The method of claim 1, further comprising:
   storing said position of said mobile station.

4. A device comprising:
   a communications interface configured to communicate by receiving N measurement reports from a mobile station, wherein N is either 2, 3, or 4, and wherein the N measurement reports indicate received signal strength relative to a given cell at different times; and
   a processor configured to:
      process the N measurement reports to produce a first output, by selecting as the first output the measurement report indicating the largest received signal strength when N is 2, an average of the measurement reports indicating the two largest received signal strengths when N is 3, and the measurement report indicating the second largest received signal strength when N is 4;
      determine at least one pathloss associated with said mobile station using said first output, and
      determine a position of said mobile station using said at least one pathloss, by determining an arc within which said mobile station is located based upon timing advance information and determining a sector within said arc within which said mobile station is located based upon said at least one pathloss.

5. The device of claim 4, wherein said communications interface is further configured to receive a request from an application to determine said position of said mobile station, and to transmit said position of said mobile station to said application.

6. The device of claim 4, wherein said device comprises a serving mobile location center.

7. The device of claim 4, further comprising:
   a memory for storing said position of said mobile station.

8. The device of claim 4, wherein the processor is further configured to sort the N measurement reports from highest to lowest received signal strength.

9. A computer program product stored on a non-transitory computer readable medium and comprising a software application that, when executed by a processor of a device, causes the device to determine a position of a mobile station in a mobile radio system based on N measurement reports received from the mobile station, wherein N is either 2, 3, or 4, wherein the N measurement reports indicate received signal strength relative to a given cell at different times, and wherein the software application causes the device to:
   process the N measurement reports to produce a first output, by selecting as the first output the measurement report indicating the largest received signal strength when N is 2, an average of the measurement reports indicating the two largest received signal strengths when N is 3, and the measurement report indicating the second largest received signal strength when N is 4;
   determine at least one pathloss associated with said mobile station using said first output, and
   determine a position of said mobile station using said at least one pathloss, by determining an arc within which said mobile station is located based upon timing advance information and determining a sector within said arc within which said mobile station is located based upon said at least one pathloss.

10. The computer program product of claim 9, wherein the software application causes the device to:
    receive a request from an application to determine said position of said mobile station; and
    transmit said position of said mobile station to said application.

11. The computer program product of claim 9, wherein the software application causes the device to store said position of said mobile station in a memory fo the device.

12. The computer program product of claim 9, wherein said device comprises a serving mobile location center.

* * * * *

UNITED STATES PATENT AND TRADEMARK OFFICE
CERTIFICATE OF CORRECTION

PATENT NO.         : 8,565,784 B2                                                           Page 1 of 1
APPLICATION NO.    : 13/001777
DATED              : October 22, 2013
INVENTOR(S)        : Zhang It is certified that error appears in the above-identified patent and that said Letters Patent is hereby corrected as shown below:

In the Specification

In Column 6, Line 15, delete "Ricean distribution." and insert -- Rician distribution. --, therefor.

In the Claims

In Column 10, Line 57, in Claim 11, delete "fo the" and insert -- of the --, therefor.

Signed and Sealed this
Seventh Day of October, 2014

Michelle K. Lee
*Deputy Director of the United States Patent and Trademark Office*